US010171318B2

(12) United States Patent
Pon et al.

(10) Patent No.: US 10,171,318 B2
(45) Date of Patent: Jan. 1, 2019

(54) SYSTEM AND METHOD OF IDENTIFYING INTERNET-FACING ASSETS

(71) Applicant: RiskIQ, Inc., San Francisco, CA (US)

(72) Inventors: David K. Pon, Sunnyvale, CA (US); Elias Manousos, San Francisco, CA (US); Chris Kiernan, San Francisco, CA (US); Ben Adams, San Ramon, CA (US); Megan Chiu, Burlingame, CA (US); Jonas Edgeworth, San Francisco, CA (US)

(73) Assignee: RiskIQ, Inc., San Francisco, CA (US)

( * ) Notice: Subject to any disclaimer, the term of this patent is extended or adjusted under 35 U.S.C. 154(b) by 0 days.

(21) Appl. No.: 14/520,029

(22) Filed: Oct. 21, 2014

(65) Prior Publication Data
US 2016/0112284 A1 Apr. 21, 2016

(51) Int. Cl.
G06F 15/173 (2006.01)
H04L 12/26 (2006.01)
H04L 29/06 (2006.01)
H04L 29/12 (2006.01)

(52) U.S. Cl.
CPC ............ H04L 43/045 (2013.01); H04L 43/10 (2013.01); H04L 61/1511 (2013.01); H04L 63/1408 (2013.01)

(58) Field of Classification Search
CPC .. H04L 43/10; H04L 63/1408; H04L 63/1433
USPC .................................................. 709/220–224
See application file for complete search history.

(56) References Cited

U.S. PATENT DOCUMENTS

| 7,035,842 | B2 | 4/2006 | Kauffman et al. |
| 7,831,611 | B2 | 11/2010 | Roberts et al. |
| 8,291,500 | B1 | 10/2012 | Bojaxhi et al. |
| 8,407,791 | B2 | 3/2013 | Granstedt et al. |
| 8,499,032 | B2 * | 7/2013 | Matkowsky ...... G06F 17/30876 707/767 |

(Continued)

FOREIGN PATENT DOCUMENTS

WO 2013044748 A1 4/2013

OTHER PUBLICATIONS

Domain Name System Security Extensions, https://en.wikipedia.org/wiki/Domain_Name_System_Security_Extensions, Jan. 25, 2016.*

(Continued)

*Primary Examiner* — Minh Chau Nguyen
(74) *Attorney, Agent, or Firm* — Wong & Rees LLP; Kirk D. Wong

(57) ABSTRACT

A method includes receiving a seed at a computing device. The method further includes identifying, based on first domain name system (DNS) data, first border gateway protocol (BGP) data, first whois data, or a combination thereof, a plurality of first internet-facing assets related to the seed. The method further includes identifying, based on second DNS data, second BGP data, second whois data, or a combination thereof, a plurality of second internet-facing assets related to at least one of the first internet-facing assets. The method further includes generating a graphical user interface (GUI) that includes a list of internet-facing assets related to the seed, where the list includes the plurality of first internet-facing assets and the plurality of second internet-facing assets.

21 Claims, 9 Drawing Sheets

(56) References Cited

U.S. PATENT DOCUMENTS

| | | |
|---|---|---|
| 8,516,377 B2 | 8/2013 | Dixon et al. |
| 8,583,612 B2 | 11/2013 | Bennett |
| 8,701,185 B2 | 4/2014 | Krishnamurthy et al. |
| 8,954,573 B2 | 2/2015 | Hugard, IV et al. |
| 9,049,207 B2 | 6/2015 | Hugard, IV et al. |
| 9,070,110 B2 | 6/2015 | Shih et al. |
| 9,172,611 B2 | 10/2015 | Guruswamy |
| 9,438,615 B2 | 9/2016 | Gladstone et al. |
| 9,438,616 B2 | 9/2016 | Singla et al. |
| 9,569,471 B2 | 2/2017 | Sharan et al. |
| 9,591,027 B2 | 3/2017 | Molloy et al. |
| 2004/0093408 A1* | 5/2004 | Hirani et al. ............. 709/224 |
| 2005/0289084 A1* | 12/2005 | Thayer ............ G06Q 20/3674 705/67 |
| 2006/0059557 A1* | 3/2006 | Markham et al. ............. 726/22 |
| 2006/0095586 A1 | 5/2006 | Adelman et al. |
| 2006/0161644 A1* | 7/2006 | Adelman ......... H04L 29/12066 709/222 |
| 2007/0011168 A1* | 1/2007 | Keohane ........ G06F 17/30887 707/999.01 |
| 2007/0094500 A1 | 4/2007 | Shannon et al. |
| 2009/0327849 A1 | 12/2009 | Kavanagh et al. |
| 2010/0042622 A1* | 2/2010 | Matkowsky ..... G06F 17/30876 707/769 |
| 2012/0023153 A1* | 1/2012 | Karasaridis ........ H04L 61/1511 709/203 |
| 2012/0042381 A1 | 2/2012 | Antonakakis et al. |
| 2012/0054869 A1* | 3/2012 | Yen ................ H04L 29/12066 709/245 |
| 2013/0227141 A1* | 8/2013 | Schmidt ........... H04L 29/12066 709/225 |
| 2013/0246605 A1* | 9/2013 | Mahadik et al. ............. 709/224 |
| 2013/0247184 A1* | 9/2013 | Mahadik et al. ............. 726/22 |
| 2014/0033307 A1 | 1/2014 | Schmidtler |
| 2014/0090058 A1 | 3/2014 | Ward et al. |
| 2014/0096251 A1* | 4/2014 | Doctor et al. ............. 726/23 |
| 2014/0173739 A1* | 6/2014 | Ahuja et al. ............... 726/25 |
| 2015/0207809 A1* | 7/2015 | MacAulay ........... G06F 21/552 726/22 |

OTHER PUBLICATIONS

B. Laurie, DNS Security (NDSSEC) Hashed Authenticated Denial of Existence (RFC 5155 section 1.1), https://tools.ietf.org/html/rfc5155#section-1.1, Mar. 2008.*

Google Answers: Domains Owned Search, Retrieved from <http://answers.google.com/answers/threadview?id=566090>, Retrieved on Oct. 21, 2014, Posted on Sep. 9, 2005, 6 pages.

Server Fault; How can I find all of the domain names owned by a company?, Retrieved from <http://serverfault.com/questions/231432/how-can-i-find-all-of-the-domain-names-owned-by-a-company>, Retrieved on Oct. 21, 2014, Posted on Feb. 4, 2011, 3 pages.

* cited by examiner

400

Group Name [Inventory List 1] —402

Let me know if...

☐ The Registrar Changes
☐ The Site is Down
☐ Has a New Redirect
☐ SSL Cert is Expired or Expiring Within 30 days
☐ Whois Contact Changes
☐ ASN Changes
☐ Domain is Expiring

SYSTEM AND METHOD OF IDENTIFYING INTERNET-FACING ASSETS

BACKGROUND

The Internet may enable users to communicate quickly and reliably over large distances. As the Internet grows in popularity, reliability, and speed, businesses may expose more and more computer assets to the Internet. For example, a business may expose a mail server to the Internet to provide e-mail services for employees, a content server to serve content (e.g., media files) to customers, a web server to serve web pages to customers, an ad server to serve ads to customers, etc. As more and more assets are exposed to the Internet, a business may find tracking which assets are exposed to the Internet difficult. As the number of assets exposed to the Internet continues to grow, it may become difficult to identify Internet-facing assets of a particular business.

SUMMARY

A discovery and inventory application may enable tracking of internet-facing digital assets owned or associated with a particular entity (e.g., a company). Examples of such assets include domains, hosts, domain name system (DNS) name servers, internet protocol (IP) addresses, IP address blocks, mail servers, secure sockets layer (SSL) certificates, web servers, web pages, cookies, and particular files (e.g., advertisements, videos, etc.).

A discovery process begins with a seed, which can be received from a user (e.g., the seed may be a domain, such as example.com). A seed can also be received from within the application via an iterative feedback process. The application may identify additional domains related to the seed. For example, the seed value may be a domain name. The application may identify a DNS name server that is included in the domain and identify each domain for which the DNS name server has a record. The application may identify the DNS name server and the domains by consulting a DNS response database. In some examples, the application may limit identified domains to domains for which the DNS name server is an authoritative name server. The application may identify each host in each domain identified and, for each identified host that is a DNS name server, recursively identify additional domains with additional hosts. When certain types of "problematic" assets (e.g., domain squatters, name servers that are connected to more than a threshold number of entities, etc.) are encountered, the discovery algorithm may avoid searching particular domains for efficiency purposes.

The discovery and inventory application may output a candidate list to the user, the candidate list including hosts identified by the discovery process. A graphical user interface (GUI) for the candidate list may enable the user to "dismiss" assets from the list. Dismissed assets may be ignored in the future (i.e., may not be presented in a subsequent asset list that is generated at a subsequent time). The user may also "confirm" assets, and confirmed assets may be used as seeds for further discovery. If a user selects an asset on the list, the GUI may display a cause tree that shows a discovery path from the initial seed value to the selected asset. The discovery and inventory application may perform scanning and updating of the asset list and may provide reporting to the user. For example, a second asset list can be generated (using the initial seed(s)), and the user may receive a report indicating differences between the first and second asset lists. The application may also provide the user with options to manually add known assets and perform discovery for "similar" domain names (e.g., example.org, which may be considered similar to example.com).

From an asset list, the user can add one or more confirmed assets into inventory. Assets (or asset groups) in inventory can be set up for automatic periodic scanning and reporting. When an asset is added into inventory, the application may identify additional information for the asset, so that policy-based scans can be performed. For example, the application may find assets in inventory that do not have a privacy policy set up, have an outdated secure sockets layer (SSL) certificate, have malware, have large files susceptible to a distributed denial of service (DDoS) attack, etc. The user can receive a notification/report when information for an asset in inventory changes or when a specific event occurs (e.g., suspected malware was found on a website in inventory).

BRIEF DESCRIPTION OF THE DRAWINGS

FIG. 4 is a diagram illustrating another example of a GUI associated with identifying internet-facing assets;

DETAILED DESCRIPTION

Figure 1:
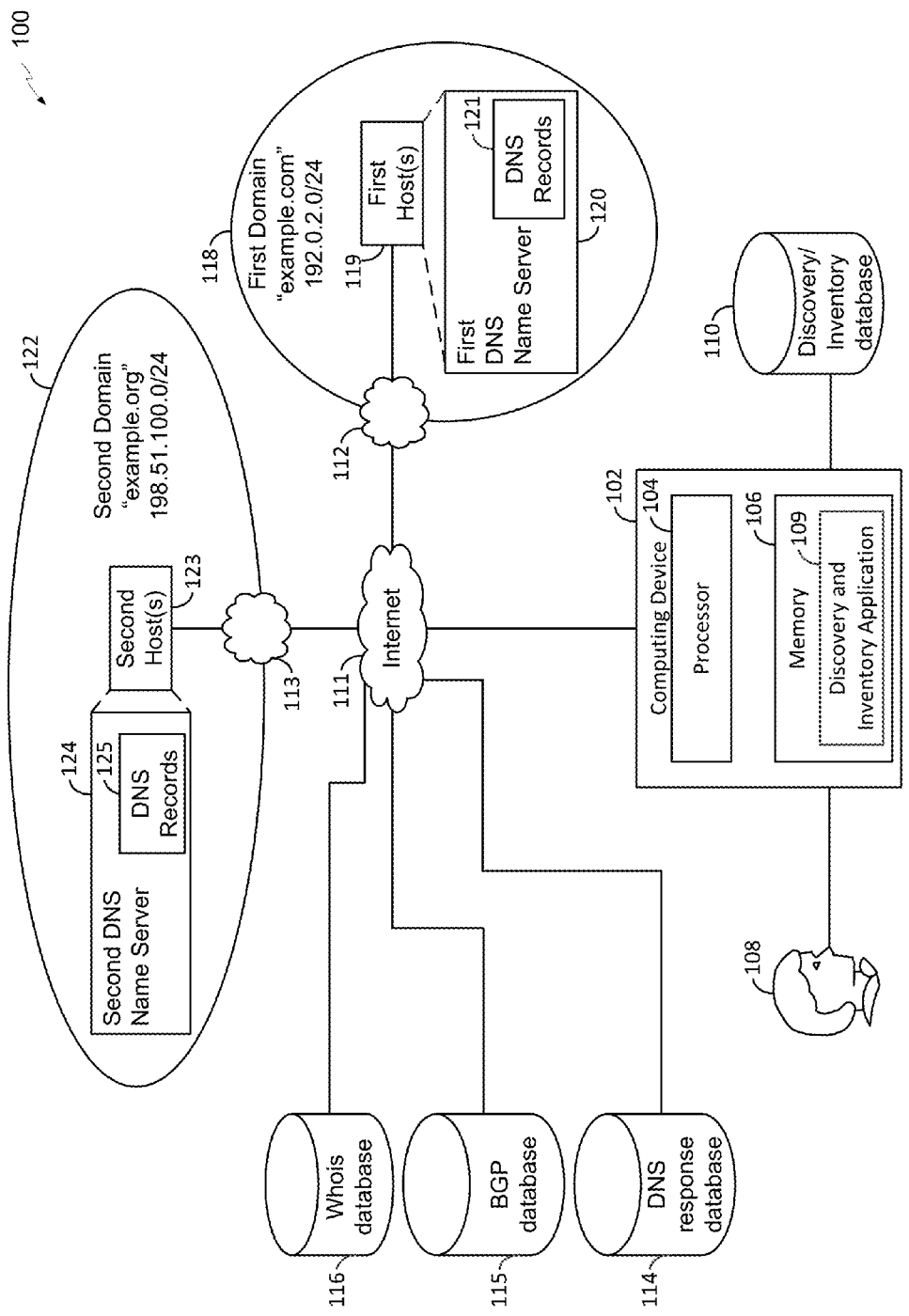
FIG. 1 is a diagram that illustrates a particular embodiment of a system that is operable to identify internet-facing assets.

Referring to FIG. 1, a diagram illustrating a system 100 that may be used to determine internet-facing assets is shown. For example, the system 100 may enable a user 108 to generate a list of internet-facing assets (e.g., domains, hosts, etc.) that are owned by or affiliated with a particular user or business entity (e.g., corporation). The system 100 may also enable the user 108 to track specific internet-facing assets, or groups of internet-facing assets. The system 100 may be configured to automatically scan/crawl internet-facing assets and notify the user 108 when information associated with an internet-facing asset changes and/or when the internet-facing asset violates a policy specified by the user 108. The system 100 may thus provide automated discovery and inventory of internet-facing assets, which may be faster, more accurate, and/or more convenient than the user 108 manually searching for and tracking such assets, such as in a spreadsheet or other document during a yearly audit.

In some examples, the computing device 102 may include additional components. To illustrate, the computing device 102 may include components to receive input from various devices (e.g., a keyboard, a mouse, a touch screen, a network, a storage device, etc.). In addition or in the alternative, the computing device 102 may include components to output data or media (e.g., a video output interface, an audio output interface, an integrated display, a network interface, a storage device interface, etc.). For example, the computing device 102 may receive input from a user 108 via one or more input interfaces and may output data or media to the user 108 via one or more output interfaces.

The memory 106 may store a discovery and inventory application 109 that may be executed by the processor 104. The discovery and inventory application 109 may be configured to determine a list of internet-facing assets, to compile information related to the internet-facing assets, and to present the list and the information to the user 108. The computing device 102 may be coupled to or in communication (e.g., via a network) with a discovery/inventory database 110. The discovery/inventory database 110 may store data (e.g., results, settings, etc.) associated with the discovery and inventory application 109.

The computing device 102 may be in communication with the internet 111. The computing device 102 may communicate with a domain name system (DNS) response database 114. The DNS response database 114 may store captured DNS messages. The captured DNS messages may include records linking a domain name to one or more internets protocol (IP) addresses (e.g., a single IP address or an IP address block). In some examples, the captured DNS messages may include records (e.g., canonical name (CNAME) records) linking domain names to domain names.

The computing device 102 may be in communication with a border gateway protocol (BGP) database 115 (e.g., a BGP enabled device). The BGP database 115 may store mappings between autonomous system numbers (ASNs) and IP addresses. The BGP database 115 may support ASN queries that include ASN(s) and result in an answer including an IP address, multiple non-contiguous IP addresses, and/or a block of contiguous IP addresses. The BGP database 115 may also support reverse ASN queries that include IP address(es) and result in an answer including ASN(s).

The computing device 102 may be in communication with a whois database 116. The whois database may store information linking an IP address, an IP address block, or a domain name to a whois contact (e.g., a contact name, a physical address, a mailing address, an e-mail address, or a combination thereof). The whois database 116 may support whois queries that include a domain name, an IP address block, or an IP address and result in an answer including a whois contact. The whois database 116 may support reverse whois queries that include a whois contact and result in an answer including a domain name, an IP address block, or an IP address.

In the illustrated example, the computing device 102 communicates with the DNS response database 114, the BGP database 115, and the whois database 116 via the internet 111. In other examples, the computing device 102 may be directly coupled to one or more of the databases 114-116, the computing device 102 may be in direct communication with one or more of the databases 114-116, or the computing device 102 may communicate with one or more of the databases 114-116 via a different network or combination of networks, which may include public network(s) and/or private network(s).

A first domain 118 may be coupled to the internet 111 via a first access network 112. The first domain 118 may be mapped (e.g., via DNS) to one or more IP addresses (e.g., a first subnet represented in CIDR notation as 192.0.2.0/24). The first domain 118 may have an associated domain name, such as "example.com."

It should be noted that although not shown in FIG. 1, the first domain 118 may include one or more sub-domains. The first domain 118 may also be a sub-domain of a larger domain. The first domain 118 may map to one or more IP addresses (e.g., via DNS), where each IP address is associated with a host. As used herein, a host may include general purpose computers, as well as other devices, that have an IP address. For example, a host may include a printer or other internet enabled device.

In the illustrated example, the first domain 118 maps to IP addresses associated with one or more first hosts 119. Each of the first hosts 119 may have an associated hostname (e.g., firsthost.example.com). A hostname may also be referred to as a fully qualified domain name (FQDN). In some examples, a host may have more than one IP address (e.g., have more than one network interface or have more than one IP address per network interface), and one or more of these IP addresses may not be mapped to the first domain 118. For example, a particular computing device may have two IP addresses. One of the IP addresses may map to a first hostname (e.g., firsthost.example.com) and another of the IP addresses may map to a second hostname (e.g., firsthost.example.net). Thus, a particular host device may belong to more than one domain.

One or more of the first hosts 119 may include (e.g., execute) a DNS name server. For example, the first hosts 119 may include a first DNS name server 120. The first DNS name server 120 may include DNS records 121. The DNS records 121 may link a domain name to one or more internet protocol (IP) addresses. In some examples, the DNS records 121 may include records (e.g., CNAME records) linking domain names to domain names. The DNS records 121 may correspond to the first domain 118. For example, the DNS records 121 may store mappings between a hostname of each of the first hosts 119 and a corresponding IP address. In some examples, the DNS records 121 may further include information regarding one or more other domains, such as a second domain 122 (e.g., "example.org"). The DNS records 121 may indicate that the first DNS name server 120 is an authoritative name server for one or both of the first domain 118 and the second domain 122. Some or all of the DNS records 121 may be stored in the DNS response database 114.

The second domain 122 may be coupled to the internet 111 via a second access network 113. The second domain 122 may be mapped (e.g., via DNS) to one or more IP addresses (e.g., second subnet represented in CIDR notation as 198.51.100.0/24).

It should be noted that although not shown in FIG. 1, the second domain 122 may include one or more sub-domains. The second domain 122 may also be a sub-domain of a larger domain. In the illustrated example, the second domain 122 is mapped to IP addresses associated with one or more second hosts 123. Each of the second hosts 123 may have an associated hostname (e.g., secondhost.example.org). In some examples, a host may have more than one IP address (e.g., have more than one network interface or have more than one IP address per network interface), and one or more of these IP addresses may not be mapped to the second domain 122. For example, a particular computing device may have two IP addresses. One of the IP addresses may map to a first hostname (e.g., secondhost.example.org) and another of the IP addresses may map to a second hostname (e.g., secondhost.example.net). Thus, a particular host device may belong to more than one domain.

One or more of the second hosts 123 may include (e.g., execute) a DNS name server. For example, the second hosts 123 may include a second DNS name server 124. The second DNS name server 124 may include DNS records 125. The DNS records 125 may link a domain name to one or more internet protocol (IP) addresses. In some examples, the DNS records 125 may include records (e.g., CNAME records) linking domain names to domain names. The DNS records 125 may correspond to the second domain 122. For example, the DNS records 125 may store mappings between a hostname of each of the second hosts 123 and a corresponding IP address. In some examples, the DNS records 125 may further include information regarding one or more other domains, such as a third domain (e.g., "example.net"). The DNS records 125 may indicate that the second DNS name server 124 is an authoritative name server for one or both of the second domain 122 and the third domain. Some or all of the DNS records 125 may be stored in the DNS response database 114.

Figure 2:
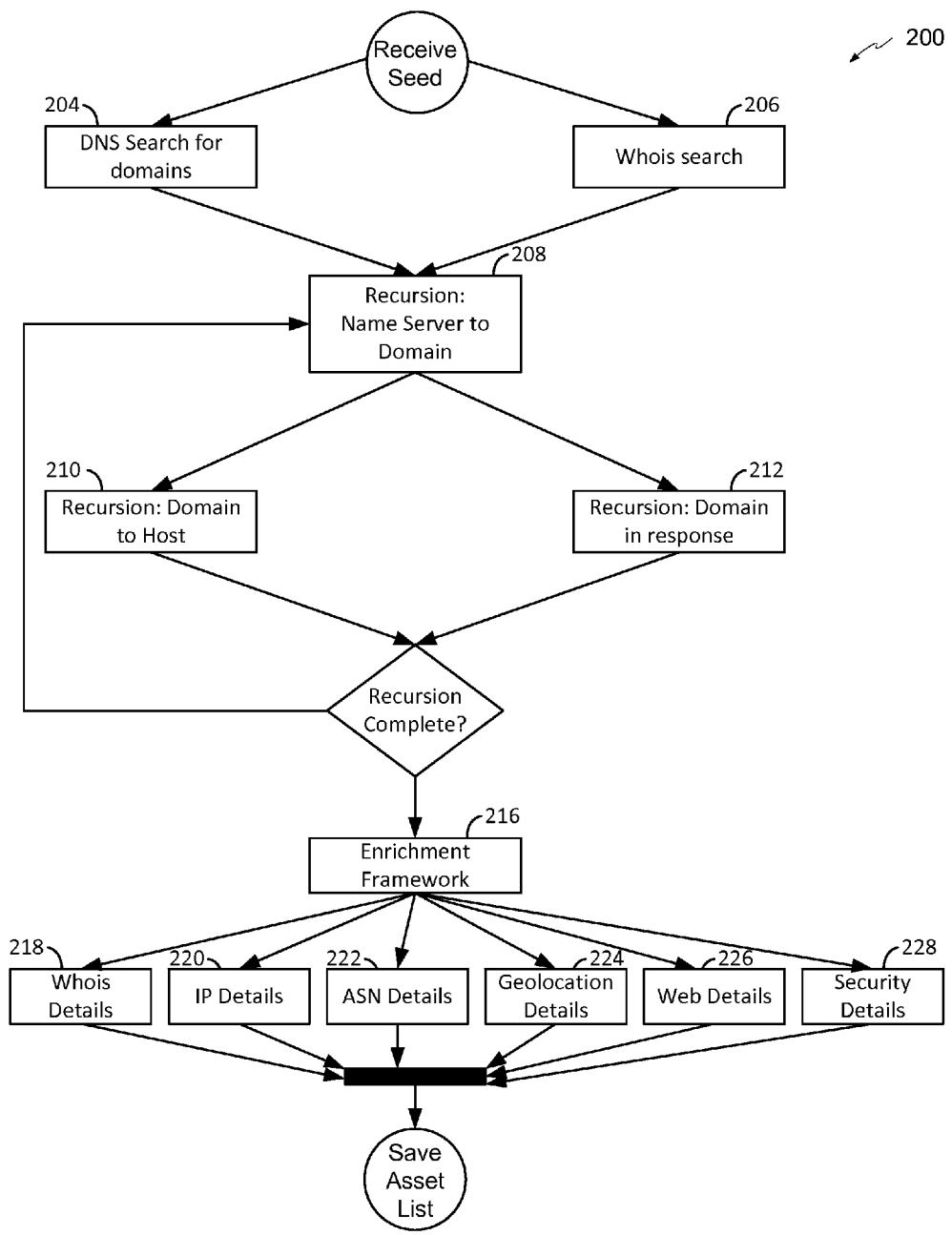
FIG. 2 is a flowchart that illustrates a method of identifying internet-facing assets.

Operation of the discovery and inventory application 109 is described with reference to FIG. 2. The discovery and inventory application 109 may receive a seed value (e.g., initial input). The seed value may be a character string that identifies a DNS name server (e.g., identified by a hostname or an IP address), a whois contact (e.g., a person's name, a physical address, a mailing address, or an e-mail address), BGP data (e.g., one or more ASNs), an internet protocol (IP) address, an IP address block, a domain name, a hostname, or a combination thereof. When the user 108 wishes to obtain a list of internet-facing assets owned by a particular user or business entity, the seed may be an internet-facing asset that the user 108 knows to be owned by the particular user or business entity. To illustrate, the seed may be "www.example.com," which the user 108 may know to be associated with Example Corporation. The discovery and inventory application 109 may build an initial list of domains associated with the seed, at blocks 204, 206.

For example, at block 204, when the seed includes a DNS name server, an ASN, an internet protocol (IP) address, an IP address block, a domain name, a hostname, or a combination thereof, the discovery and inventory application 109 may identify one or more associated DNS name servers. As an illustrative non-limiting example, the discovery and inventory application 109 may invoke a software method or service that receives the seed as input and returns a list of domains. A DNS server (e.g., the first DNS name server 120) may be identified as being related to the seed. In some examples, the seed may identify the DNS name server. In other examples, the discovery and inventory application 109 queries the DNS response database 114 for a DNS name server related to an IP address, a domain name, an IP address block, or a hostname. In examples where the seed includes BGP data, the discovery and inventory application 109 may query the BGP database 115 to determine one or more IP addresses related to one or more ASNs included in the BGP data. The discovery and inventory application 109 may query the DNS response database 114 for one or more DNS name servers related to the one or more IP addresses. In particular embodiments, the discovery and inventory application 109 may query DNS name server(s) for DNS zone file(s) and may use the DNS zone file(s) to identify a DNS server associated with the seed.

Once one or more DNS name servers (e.g., the DNS name server 120) have been identified, the discovery and inventory application 109 determines domains (e.g., the first domain 118) for which the one or more DNS name servers store records. The domains for which the first DNS name server 120 stores records are returned. In some examples, only domains for which the first DNS name server 120 is an authoritative name server are returned.

Alternatively, when the seed includes a whois contact, the discovery and inventory application 109 may identify domains associated with the whois contact, at the block 206. For example, a method or service may be invoked that that receives the seed as input and returns a list of domains. To illustrate, the discovery and inventory application 109 may query (e.g., using a reverse whois query) the whois database 116 for domains associated with the whois contact. The whois database 116 may return domains, such as the first domain 118 (e.g., 192.0.2.0/24).

At block 208, the discovery and inventory application 109 may recursively search for additional domains based on the domains list generated by the DNS search and/or the whois search. For example, the block 208 may include searching each domain in the domains list for DNS name servers. The block 208 may include querying the DNS response database 114 to determine what DNS name servers are in each domain, or may include issuing a query to a DNS name server for name server records (e.g., DNS zone files) for each domain. Referring to FIG. 1, the discovery and inventory application 109 may determine that the first domain 118 includes the first DNS name server 120.

Once the DNS name servers have been discovered, the discovery and inventory application 109 may determine "new" (i.e., not in the initial list) domains that the DNS name servers store records for. In particular examples, DNS name servers that include records for a number of domains that exceeds a threshold are ignored (e.g., not searched for new domains). The new domains may be added to the domains list. For example, the discovery and inventory application 109 may determine, by querying the DNS response database 114 or the first DNS name server 120, that the first DNS name server 120 includes DNS records 121 related to the second domain 122, which may be added to an in-progress candidate list that identifies internet-facing assets that have been identified as likely being owned by or affiliated with the same user or business entity as the internet-facing asset identified by the initially received seed. The candidate list may include internet-facing assets (e.g., domains and/or hosts) that are identified based on the initially received seed, and may therefore be likely to be associated with the same entity (e.g., owner) as the initially received seed.

At block 210, the domains of the domains list may be searched for hosts. The hosts may be identified by querying the DNS response database 114 or by querying a DNS name server (e.g., for a zone file). For example, the block 210 may identify the first hosts 119 and the second hosts 123 and add the identified hosts to the candidate list.

Alternatively, or in addition, at block 212, the DNS response database 114 or a DNS name server may be queried for canonical name (CNAME) records that point to the domain. Thus, the block 212 may be used to find "aliases" for the items in the domains list. Such aliases (e.g., hostnames or other domains) may be added to the candidates list. In a particular embodiment, an alias may be ignored (e.g., not added to the candidates list or the domains list) when an authoritative DNS name server for the alias is not in the candidates list.

The process described above with reference to blocks 208-212 may be repeated in recursive fashion to discover additional "new" domains and discover additional "new" hosts associated with the additional "new" domains. When no additional new domains are discovered by a recursive instance of the block 208, the discovery and inventory application 109 may proceed to block 216. Alternate embodiments of the discovery and inventory application 109 may implement iterative search strategies, instead of recursive search strategies, to discover domains and hosts to generate the candidate list. Thus, the discovery and inventory application 109 may, based on an initial seed, identify a candidate list of hosts and domains that are exposed to the internet.

At the block 216, the discovery and inventory application 109 may process the candidates list using an enrichment framework. The enrichment framework may collect information regarding each entry (e.g., hosts and domains) in the candidate list. For example, the enrichment framework may gather (e.g., by querying the whois database 116) whois contact information for each entry in the candidate list, as shown at block 218.

As another example, the enrichment framework may obtain IP details regarding each entry in the candidate list, as shown at block 220. The IP details may include an IP address associated with the entry, a hostname, a domain associated with a host, a domain name, or a combination thereof. The IP details may further include an identification of a domain name registrar associated with the entry. The IP details may also include whether the entry includes or provides particular services (e.g., whether a host includes a web server, a DNS name server, a mail server, or a combination thereof). The services may be determined by port scanning a host, by examining DNS records (e.g., from the DNS response database 114, from one or more DNS servers, or a combination thereof), or a combination thereof.

The enrichment framework may further determine ASN details for each entry in the candidate list, as shown at block 222. For example, the enrichment framework may determine an ASN associated with an entry and who owns the AS identified by the ASN. In a particular example, the ASN details are determined based on a query to a database (e.g. the BGP database 115).

The enrichment framework may determine geolocation details for each entry in the candidate list (e.g., where a host or domain is physically located), as shown at block 224. Geolocation details of the entry may be determined based on the entry's IP address, ASN, and/or queries to a database that maps ASNs or IP addresses to geolocations.

The enrichment framework may also determine web details of each entry in the candidate list, as shown at block 226. For example, the web details may include whether a host is "down" or offline (e.g., by detecting that the host is not responsive to messages or that a threshold number of web pages associated with the host fail to load when the enrichment framework attempts to access the web pages). As another example, the enrichment framework may determine whether an entry has up to date credentials (e.g., a SSL certificate). For example, the enrichment framework may query a certificate authority to determine whether a certificate is current. As yet another example, the enrichment framework may determine whether a webserver redirects to another host, returns error messages (e.g., pages fail to load), etc. As yet another example, the enrichment framework may determine a language associated with an entry (e.g., a language in which a host responds to a query).

The enrichment framework may further determine security details of each entry in the candidate list, as shown at block 228. In some examples, the enrichment framework may determine a host's (or domain's, server's, website's, etc.) "reputation" (e.g., based on data stored in a database), whether the host has malware (e.g., based on data stored in a database or based on a comparison between a binary file downloaded from the host and a "reference" binary file indicative of malware), whether the host is a known spammer (e.g., based on data stored in a database), whether the host is known to be associated with phishing scams (e.g., based on data stored in a database), or a combination thereof.

The candidate list, along with the details obtained by the enrichment framework, may be stored by the discovery and inventory application 109 in the discovery/inventory database 110. In a particular embodiment, the discovery and inventory application 109 stores a "pathway" for each entry indicating a search path from the seed through each domain searched to discover the entry. The discovery and inventory application 109 may present the candidate list and the details to the user 108 via a graphical user interface (GUI).

In particular examples, the discovery and inventory application 109 may support a searching for "similar" assets. The discovery and inventory application 109 may receive a domain name or a hostname from the user 108 and may search the DNS response database 114 for domain names and hostnames that are "similar" to the received domain name or hostname. Similarity between domain/hostnames may be determined based on common words, common character combinations, or by another string similarity metric. As an example, when the user inputs "example.com," the discovery and inventory application 109 may identify "example.org," "examples.net," and/or "forexample.com" as being "similar," and may add such "similar" domain(s) to the candidate list.

Figure 3:
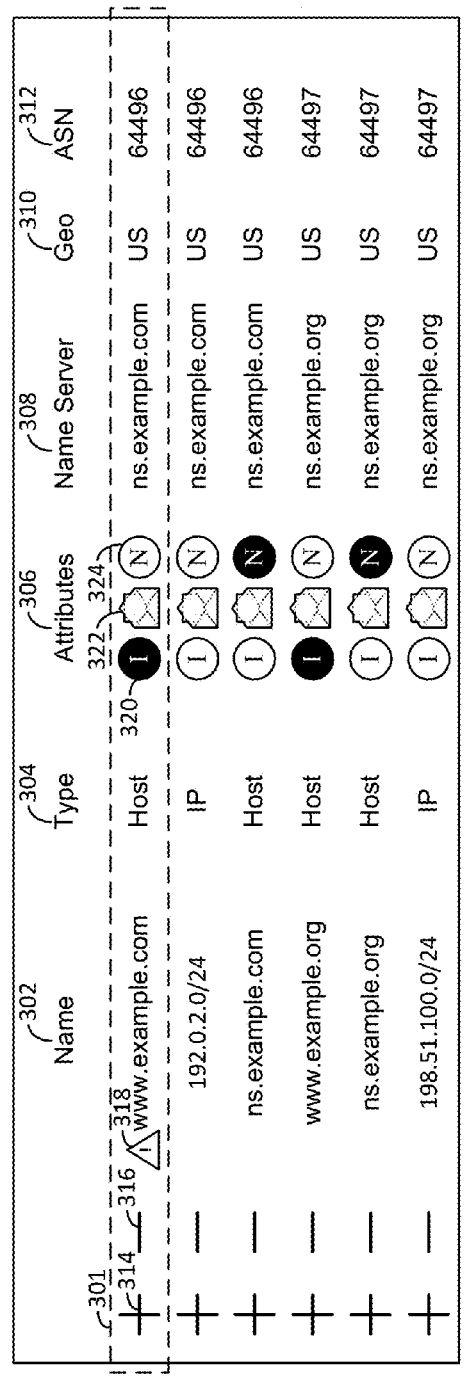
FIG. 3 is a diagram illustrating an example of a graphical user interface (GUI) associated with identifying internet-facing assets.

FIG. 3 illustrates an example of a GUI 300 that may be generated by the discovery and inventory application 109. The GUI 300 may display the entries of the candidate list and some or all of the details obtained by the enrichment framework. The name column 302 may display a hostname for each host in the candidate list and an IP address (e.g., in CIDR notation) for each domain. For example, a first entry 301 in the candidate list may correspond to a host that has a hostname www.example.com. The first entry 301 may correspond to one of the first hosts 119. The GUI 300 further includes a type column 304. The type column 304 may display whether each entry in the candidate list is a host or a domain. For example, the first entry 301 is indicated as being a host.

The GUI 300 may further include an attributes column 306. The attributes column 306 may include icons representing services. For example, a first icon 320 may indicate whether the host at www.example.com includes a web server service. A second icon 322 may indicate whether the host at www.example.com includes a mail server service. A third icon 324 may indicate whether the host at www.example.com includes a DNS name server service. In the illustrated example, the attributes column 306 indicates that the host at www.example.com includes a web server service but not a mail server service or a DNS name server service.

The GUI 300 may further include a name server column 308. The name server column 308 may identify an authoritative name server for entries in the candidate list. For example, the first entry 301 has an authoritative name server ns.example.com, which may correspond to the first DNS name server 120 of FIG. 1.

The GUI 300 may further include a geo column 310. The geo column 310 may indicate a geographic location associated with each entry of the candidate list. For example, the host at www.example.com is indicated as being located in the United States.

The GUI 300 may further include an ASN column 312 that indicates an ASN associated with each entry in the candidate list. In the illustrated example, an IP address of the host at www.example.com is indicated as being part of an AS corresponding to the ASN 64496.

The discovery and inventory application 109 may include alerts information in the GUI 300. For example, a warning icon 318 is shown for the first entry 301. The warning icon 318 may be displayed in response to the discovery and inventory application 109 determining that the first entry 301 is a security risk (e.g., based on details gathered by an enrichment framework, as described with reference to FIG. 2). As illustrative non-limiting examples, the enrichment framework may have determined that the host at www.example.com has an expired SSL certificate or hosts malware.

The GUI 300 may include additional data in response to selections received from a user. For example, the user 108 may select the warning icon 318. In response to the selection of the warning icon 318, the discovery and inventory application 109 may update the GUI 300 to display additional details associated with the warning icon 318 (e.g., the reason why the warning icon was displayed). Further, in response to receiving a selection of an entry, such as the first entry 301, the discovery and inventory application may update the GUI 300 to display additional details regarding the entry, such as details gathered by the enrichment framework described with reference to FIG. 2.

In a particular embodiment, the GUI 300 includes a confirm button (e.g., a confirm button 314 associated with the first entry 301) and a dismiss button (e.g., a dismiss button 316 associated with the first entry 301) for each entry in the candidate list. Upon receiving a selection of the dismiss button 316, the discovery and inventory application 109 may remove the first entry 301 from the candidate list. The discovery and inventory application 109 may add also add the first entry 301 to an ignore list maintained in the discovery/inventory database 110. Entries in the ignore list may be ignored by the discovery and inventory application 109 in future searches. For example, ignored domains may not be recursively searched. Further, ignored entries may not be added to future candidate lists. In particular examples, the discovery and inventory application 109 maintains an ignore list for each seed that is used for searching. An entry ignored for a particular seed may not be ignored in future searches using a different seed.

Upon receiving a selection of the confirm button 314, the discovery and inventory application 109 may add the first entry 301 to an inventory list. The discovery and inventory application 109 may store the inventory list in the discovery/inventory database 110. The inventory list may be associated with the seed or another user-defined grouping. In particular examples, the discovery and inventory application 109 may receive user input from the user 108 defining grouping criteria. Items that are added to inventory may be grouped automatically by the grouping criteria. Examples of criteria include whether an entry includes a particular service (e.g., webserver, E-mail, DNS name server, etc.) or a combination of services, whether an entry has or does not have a particular whois contact, whether an entry has a particular security status (e.g., has a SSL certificate, has an expired certificate, has malware, has a particular reputation, etc.), whether an entry belongs to a particular ASN, whether an entry belongs to a particular domain, etc. The discovery and inventory application 109 may, based on input from the user 108, periodically scan entries in the inventory list (e.g., using the enrichment framework described with reference to FIG. 2). For example, entries may be periodically scanned to whether details ascertained by the enrichment framework have changed.

In particular examples, the GUI 300 may include an additional field to receive input from the user 108. The additional field may enable the user 108 to manually enter a domain or a host to be added to inventory. The discovery and inventory application 109 may receive the user input and add the identified domain or host to the inventory list.

The discovery and inventory application 109 may be configured to generate alerts or reports based on the periodic scans performed on entries in an inventory list. For example, an alert may be generated when an entry of the inventory list that previously did not satisfy grouping criteria begins to satisfy the grouping criteria. Alternatively, an alert may be generated when an entry that satisfied grouping criteria no longer satisfies grouping criteria. As illustrative non-limiting examples, an alert may be provided to the user 108 when an SSL certificate expires, when an internet-facing asset goes offline, when malware or phishing is detected, when a name server or ASN for an internet-facing asset changes, etc. The GUI 300 of FIG. 3 may thus enable the user 108 to view internet-facing assets identified based on an initial seed value, view enrichment details and security alerts regarding the assets, skip identification of assets (e.g., by using a dismiss button), and add assets to inventory (e.g., by using a confirm button).

Referring to FIG. 4 another GUI 400 that may be displayed by the discovery and inventory application 109 is shown. The GUI 400 may be configured to receive user input defining policies that determine when the discovery and inventory application 109 should generate an alert. For example, the GUI 400 includes a box 402. The box 402 may be configured to receive input indicating an inventory list or an inventory group (e.g., corresponding to entries added to an inventory list or to an inventory group using the GUI 300) to generate an alert or a report for when the details related to an entry in the inventory list change (e.g., when a web server goes offline). The GUI 400 further includes a list 404 of options which policies the discovery and inventory application 109 will use to generate alerts. When an alert is triggered, an icon (e.g., the warning icon 318) displayed by a GUI generated by the discovery and inventory application 109. Alternatively, or in addition, a message (e.g., an e-mail, a text message, etc.) may be sent by the discovery and inventory application 109 to the user 108 (e.g., to a computing device associated with the user 108).

Thus, the system 100 may enable detection and presentation of a list of assets associated with an initial value that are exposed to the internet and may enable periodic monitoring of the internet-exposed assets.

Figure 5:
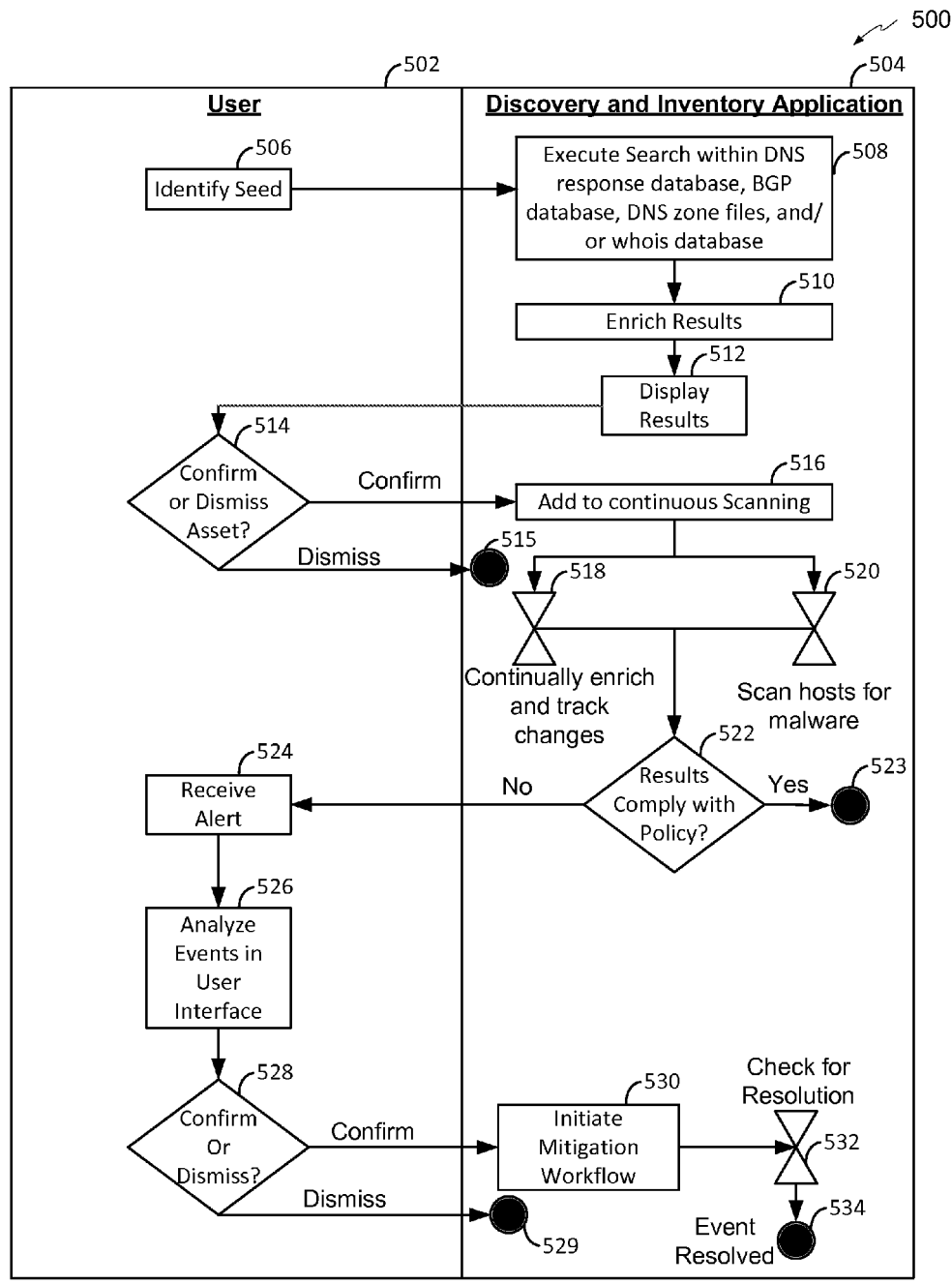
FIG. 5 is a flowchart illustrating another method of identifying internet-facing assets.

Referring to FIG. 5, a flowchart illustrating a method 500 of monitoring internet-facing assets is shown is shown. The method 500 illustrates operations performed by a user 502, such as the user 108, as well as operations performed by a discovery and inventory application 504, such as the discovery and inventory application 109. The user 502 may identify a seed and input the seed to the discovery and inventory application 504, at 506. The seed may include a DNS name server (e.g., identified by a hostname or an IP address), a whois contact (e.g., a person's name, a physical address, a mailing address, or an e-mail address), an ASN, an internet protocol (IP) address, an IP address block, a domain name, a hostname, or a combination thereof.

The discovery and inventory application 504 may search within a DNS response database, a BGP database, DNS zone files, and/or a whois database to generate a candidate list of domains and hosts based on the seed, at 508. In a particular embodiment, the search may be conducted as described with reference to FIG. 2. The discovery and inventory application 504 may further enrich the results of the search (e.g., a candidate list of domains and hosts) by gathering details regarding the results, at 510. Enrichment may be carried out as described above with reference to FIG. 2.

The discovery and inventory application 504 may display the results (e.g., the candidate list), at 512. For example, the results may be displayed using the GUI 300. The user 502 may (e.g., via the GUI 300) confirm or dismiss assets, at 514. When the user 502 dismisses an asset, the asset may not be monitored and the method 500 may end for that asset, at 515. For example, the asset may be added to an ignore list stored in the discovery/inventory database 110 of FIG. 1 and may be ignored in future searches by the discovery and inventory application 504. When the user 502 confirms a particular asset (e.g., via the GUI 300), the particular asset may be added to a "continuous" scanning group, at 516. It should be noted that as used herein, "continuous" scanning does not mean that an asset is scanned 24 hours a day. Continuous scanning may also include periodic, random, and/or user-input-driven scanning. When a confirmed asset is added to the continuous scanning group, the discovery and inventory application 504 may enrich and track changes to the confirmed asset, at 518. For example, the enrichment details for the confirmed asset may be periodically updated. The frequency of enrichment may be responsive to user input. In addition, the discovery and inventory application 504 may periodically scan hosts for malware, at 520.

The discovery and inventory application 504 may determine whether the confirmed asset complies with a policy set by the user 502 (e.g., via the GUI 400), at 522. When the confirmed asset complies with the policy, the method 500 may end for that asset, at 523. For example, while the confirmed asset complies with the policy, the confirmed asset may remain in the continuous scanning group and the discovery and inventory application 504 may continue enriching, tracking changes at, and scanning the confirmed asset for malware. When the confirmed asset does not comply with the policy, the discovery and inventory application 504 may send an alert to the user 502 (e.g., via a GUI, a text message, an e-mail, etc.).

The user 502 may receive the alert, at 524, and may analyze events (e.g., changes in details of the confirmed asset) that caused the confirmed asset to no longer comply with the policy, at 526. The user 502 may decide to confirm or dismiss the alert, at 528. In response to the user dismissing the alert, the discovery and inventory application 504 may log the event (e.g., in the discovery/inventory database 110) that generated the alert, but may not attempt remedial action, and the method may end for the asset, at 529.

When the user 502 confirms the alert, the discovery and inventory application 504 may initiate a mitigation workflow, at 530. For example, if the alert is for phishing, initiating the mitigation workflow may include contacting a third-party takedown service and providing details regarding the internet-facing asset to the third-party takedown service. The discovery and inventory application 504 may check (e.g., periodically) for resolution of the event until resolution occurs, at 532. When the event is resolved, the discovery and inventory application 504 may continue monitoring the confirmed asset for changes, and the method may end for the asset, at 534.

Figure 6:
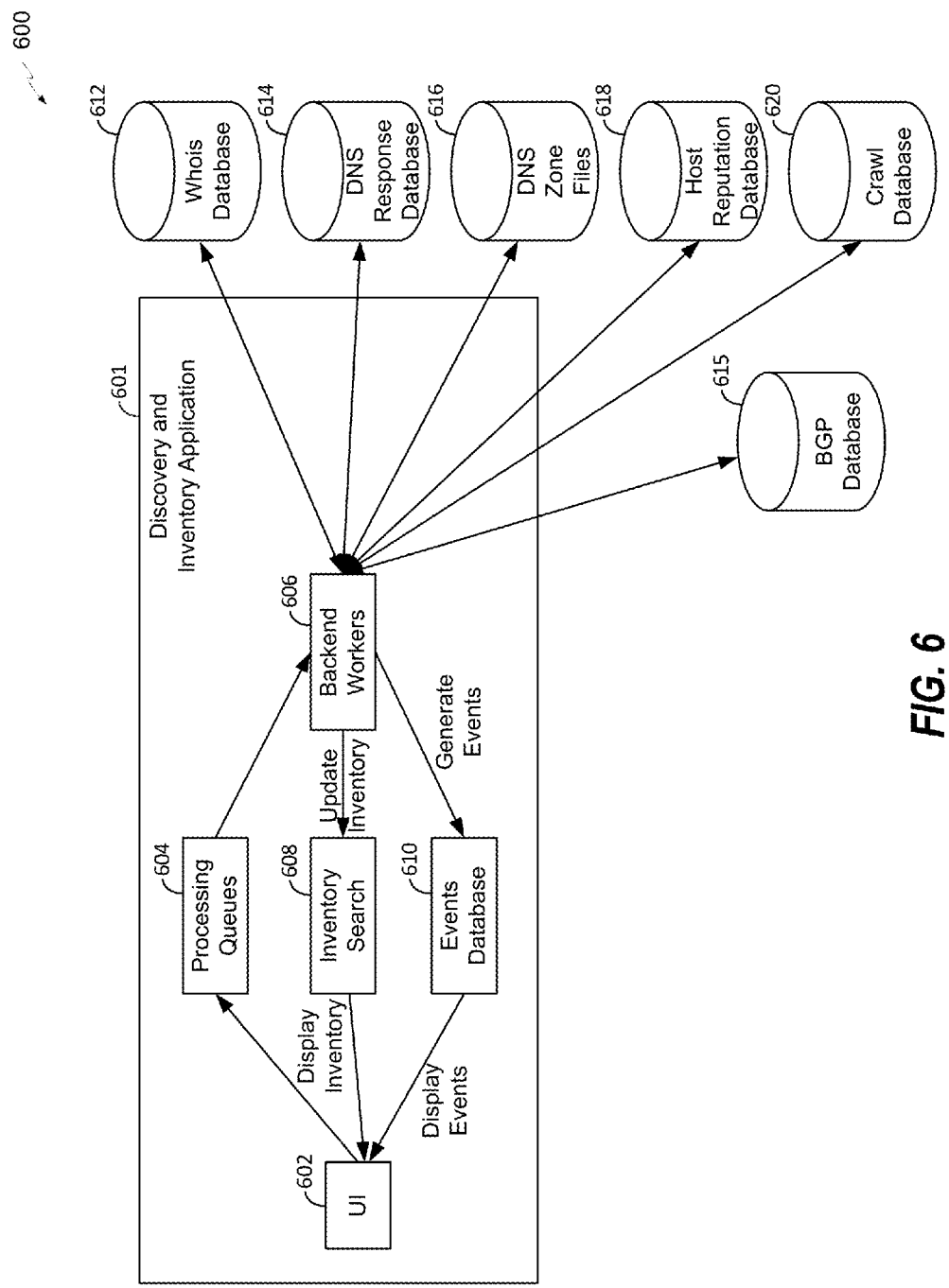
FIG. 6 is a diagram illustrating a system of identifying internet-facing assets.

Referring to FIG. 6, a diagram 600 illustrating operation of a discovery and inventory application 601 is shown. In an illustrative example, the discovery and inventory application 601 corresponds to the discovery and inventory application 109 of FIG. 1. The discovery and inventory application 601 includes a user interface 602 and may receive user input via the user interface 602. For example, the user input may include a seed value and a command to search for related hosts and domains. As another example, the user input may include a command to monitor entries in an inventory list for compliance with a policy. As another example, the user input may include a command to initiate a mitigation workflow when an asset does not comply with a policy.

The user interface 602 may provide the user input to processing queues 604. The processing queues 604 may provide the user input to backend workers 606 to be processed. For example, the backend workers may correspond to software tasks or threads that perform a search for hosts and domains related to a particular input value (e.g., an initially received seed or an asset identified based on recursive DNS/whois querying). The backend workers may search a whois database 612 (e.g., the whois database 116), a DNS response database 614 (e.g., the DNS response database 114), a BGP database 615 (e.g., the BGP database 115), DNS zone files 616 (e.g., the DNS records 121 or the DNS records 125), or a combination thereof to determine a candidate list of hosts and domains. As another example, the backend workers may gather details of hosts and domains and monitor the details for compliance with a policy by querying the whois database 612, the DNS response database 614, the BGP database 615, the DNS zone files 616, a host reputation database 618, a crawl database 620, or a combination thereof. The backend workers 606 may also initiate or attempt to implement a mitigation workflow.

When the backend workers 606 detect a change in details of a host or a domain, the backend workers 606 may update an inventory search module 608. The inventory search module 608 may update the user interface 602 based on the changed details. When the backend workers 606 detect that the details of a host or a domain do not comply with a policy, the backend workers 606 may send an event to the events database 610. The events database 610 may send the event to the user interface 602 to be displayed. For example, the event may correspond to an alert message. The discovery and inventory application 601 may thus enable automated discovery and management of internet facing hosts and domains.

Figure 7:
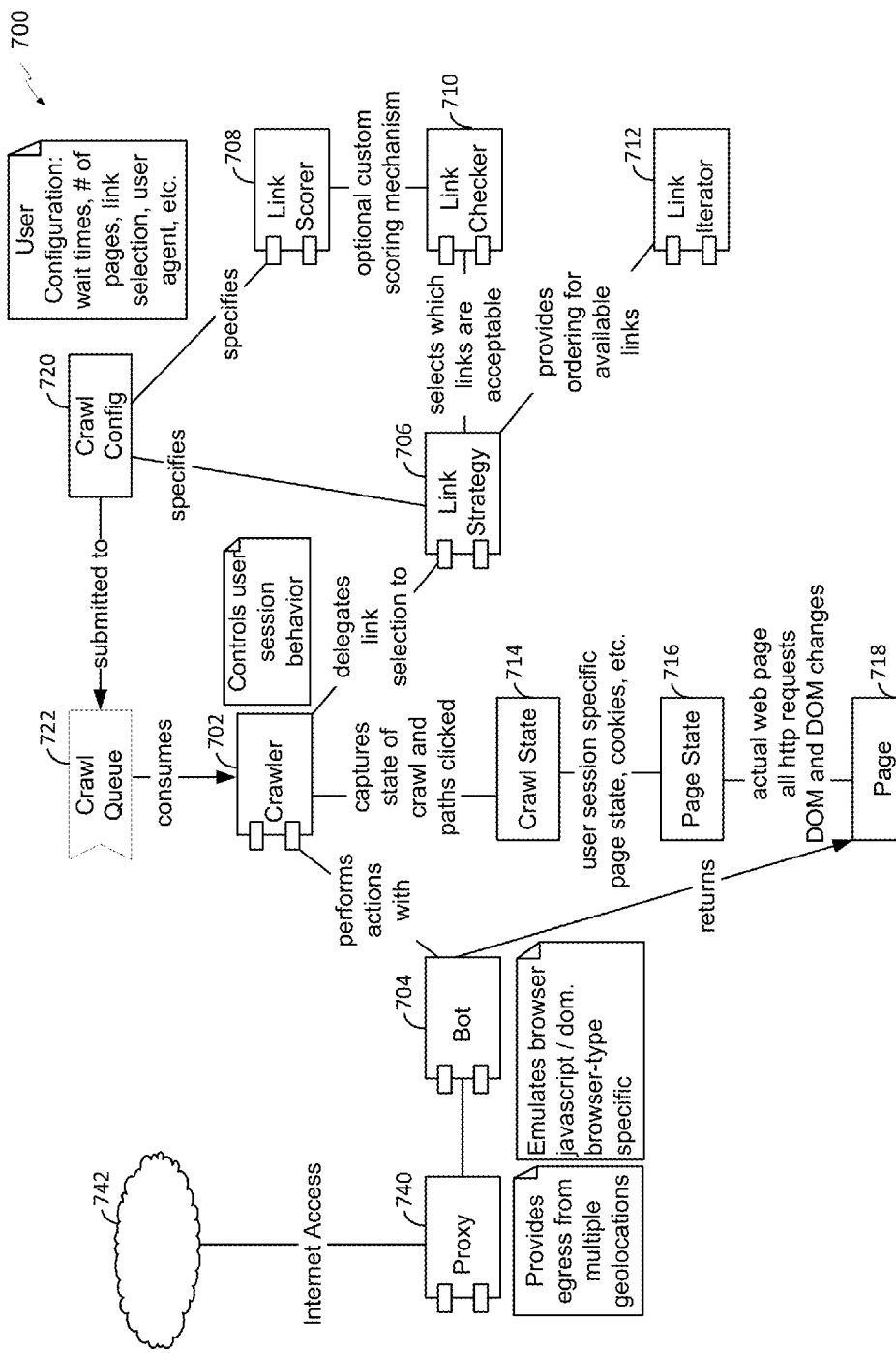
FIG. 7 is a diagram illustrating a system for monitoring internet-facing assets.

Referring to FIG. 7, a diagram illustrating a crawling system 700 that may be used to obtain information regarding internet-facing assets is shown. The crawling system 700 may be included as a part of a discovery and inventory application, such as the discovery and inventory application 109 or the discovery and inventory application 504. Alternatively, the system 700 may correspond to software that is accessible to a discovery and inventory application. For example, the crawling system 700 may be used by the discovery and inventory application 109 or the discovery and inventory application 504 to monitor internet-facing assets that have been added to an inventory. The crawling system 700 may include a crawler module 702, a bot 704, a link strategy module 706, a link scorer module 708, a link checker 710, and a link iterator 712.

The system 700 may include and/or be coupled to one or more proxy servers 740. The proxy servers 740 may be coupled to the internet 742 and may enable the crawling system 700 to send messages to internet-facing assets (e.g., entries in the inventory) that "appear" to come from a variety of geographic regions, network locations, and/or user agents (e.g., web browser types). Thus, using the proxy servers 740 to message the internet-facing assets may enable the crawling system 700 to receive responses from the internet-facing assets that may not be received if the messages appeared to come from a computer executing the crawling system 700.

For example, a malicious actor may configure an internet-facing host to resemble a host associated with a bank. The internet-facing host may be configured to respond to messages from a domain associated with the bank with a first response that is benign (e.g., does not include a phishing message). The internet-facing host may be configured to respond to messages from outside the domain with malicious messages (e.g., messages that include phishing messages). By using the proxy servers 740, the crawling system 700 may anonymously interact with internet-facing assets to more accurately capture information regarding the internet-facing assets.

The crawling system 700 may initiate web browser sessions with internet-facing hosts via the proxy servers 740. The crawler module 702 may control session behavior while the crawling system 700 is browsing a web page. The crawler module 702 may maintain a crawl state 714, which may indicate a path taken (e.g., a series of web pages visited) by the crawler module 702. The crawler module 702 may further maintain a page state 716 indicating user session specific page state information (e.g., may track cookies associated with a page). The crawler module 702 may further track a page 718. The page 718 may correspond to a page the crawling system 700 is currently visiting or has previously visited.

The crawler module 702 may perform actions using the bot 704. The bot 704 may emulate a web browser and may send messages to internet-facing assets that include a web server. The bot 704 may be configured to navigate links (e.g., hyperlinks) according to instructions from the crawler module 702. The bot 704 may capture information regarding each page visited. The information may include cookie information, how many media files (e.g., pictures) are displayed on the page, what other types of media are included in the page, etc. When the bot 704 visits a new page, the bot 704 updates the page 718.

The crawler module 702 may delegate link selection (e.g., which links of a web page to follow and in what order) to the link strategy module 706. The link strategy module 706 may send a list of links on a web page to the link checker 710. The link checker 710 may determine which links are acceptable.

The link strategy module 706 may send the acceptable links to the link iterator 712. The link iterator 712 may order the acceptable links based on criteria, such as how close to the root directory of a web page the links are, as an illustrative non-limiting example, and may return the ordered links to the link strategy module 706.

The link strategy module 706 and the link scorer module 708 may generate a crawl configuration 720. The crawl configuration 720 may specify a sequence of links to be followed by the crawler module 702. The crawl configuration 720 may be submitted to a crawl queue 722, which may be provided to the bot 704.

Thus, the crawler system 700 may enable automatic and anonymous monitoring of internet-facing assets with web servers, including simulating access of the monitored internet-facing assets by devices from different geographic locations and by different user agents (e.g., different types of laptop/desktop web browsers, different types of mobile web browsers, etc.).

Figure 8:
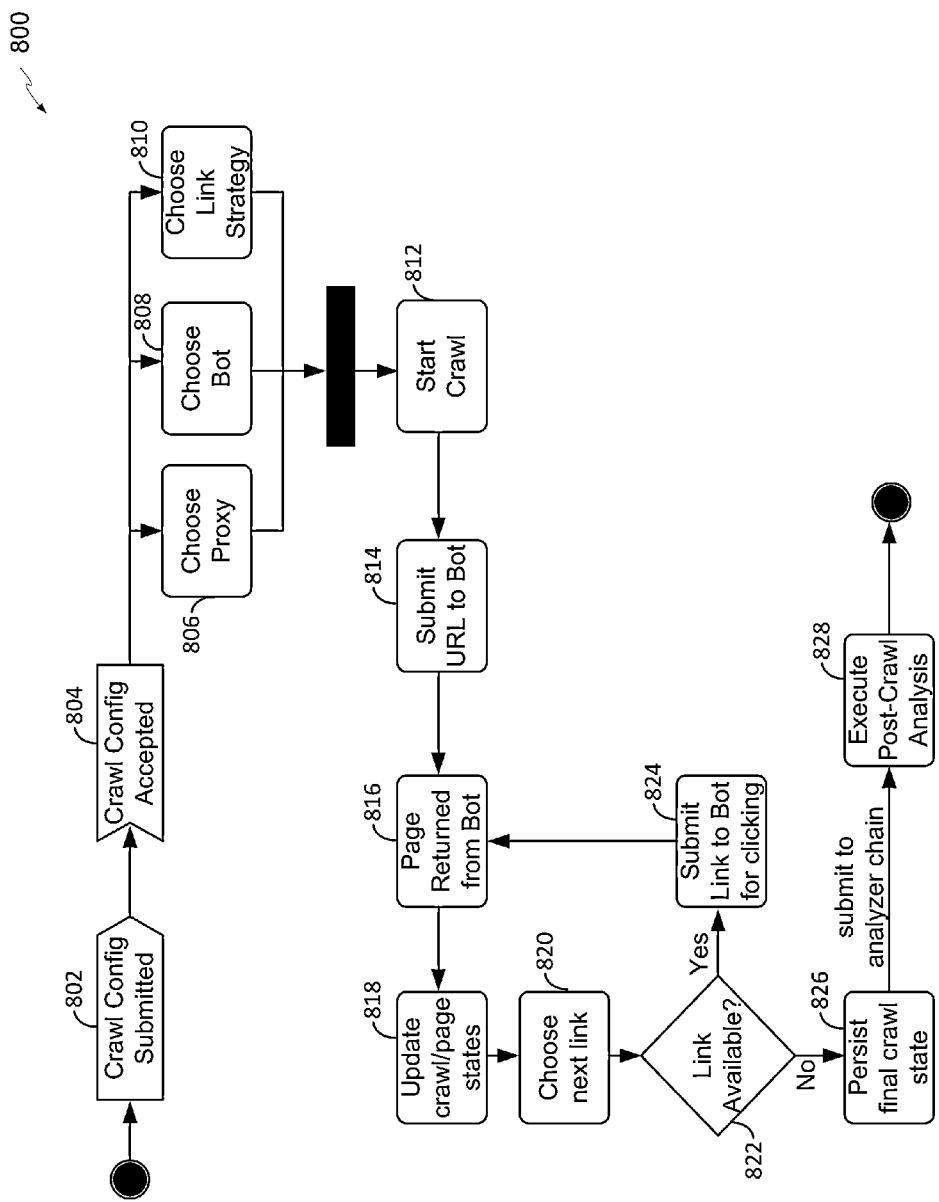
FIG. 8 is a flowchart illustrating a method of monitoring internet-facing assets.

Referring to FIG. 8, a flowchart illustrating a method 800 of crawling an internet-facing asset is shown. In an illustrative embodiment, the method 800 may be performed by the crawler system 700. The method 800 includes submitting a crawl configuration, at 802. For example, the link strategy module 706 and the link scorer module 708 may submit the crawl configuration 720 to the crawl queue 722.

The method 800 further includes accepting the crawl configuration, at 804.

For example, the crawler module 702 may accept the crawl configuration 720 from the crawl queue 722 after verifying that the crawl configuration 720 is free of errors (e.g., formatted correctly, includes necessary username/password information, etc.). The method further includes choosing a proxy, at 806. For example, the crawler module 702 may choose one or more of the proxy servers 740 to use (e.g., based on the crawl configuration 720) to access an internet-facing asset. The method 800 further includes choosing a bot, at 808. For example, the crawler module 702 may choose one or more of the bot modules 704 to use (e.g., based on the crawl configuration 720) to access an internet-facing asset. The method 800 further includes choosing a link strategy, at 810. For example, the crawler module 702 may choose a link strategy based on the crawl configuration 720.

The method 800 further includes starting a crawl, at 812, based on the chosen proxy, bot, and link strategy. For example, the crawler module 702 may begin a crawl of a web page. The method 800 further includes submitting a uniform resource locator (URL) to a bot, at 814. For example, the crawler module 702 may submit a URL for a web page to the bot module 704. The method further includes receiving a page from the bot, at 816. For example, the bot module 704 may update the page 718. The method 800 further includes updating a crawl state and a page state, at 818. For example, the crawler module 702 may update the crawl state 714 and the page state 716 based on the page 718.

The method 800 further includes choosing a "next" link based on the link strategy, at 820, and determining whether the chosen link is available, at 822. When the link is available, the crawler may submit the link to the bot, at 824, and the method 800 may return to 816. When the link is unavailable, the method 800 includes persisting (e.g., storing) a final crawl, at 826. For example, the crawler module 702 may update the crawl state 714 to a finished state. The method 800 further includes executing a post-crawl analysis, at 828. For example, the crawler module 702 may determine post-crawl information, such as a number of links followed, a number of cookies encountered, a number of images found, and/or a number of other media files found, as illustrative non-limiting examples.

Figure 9:
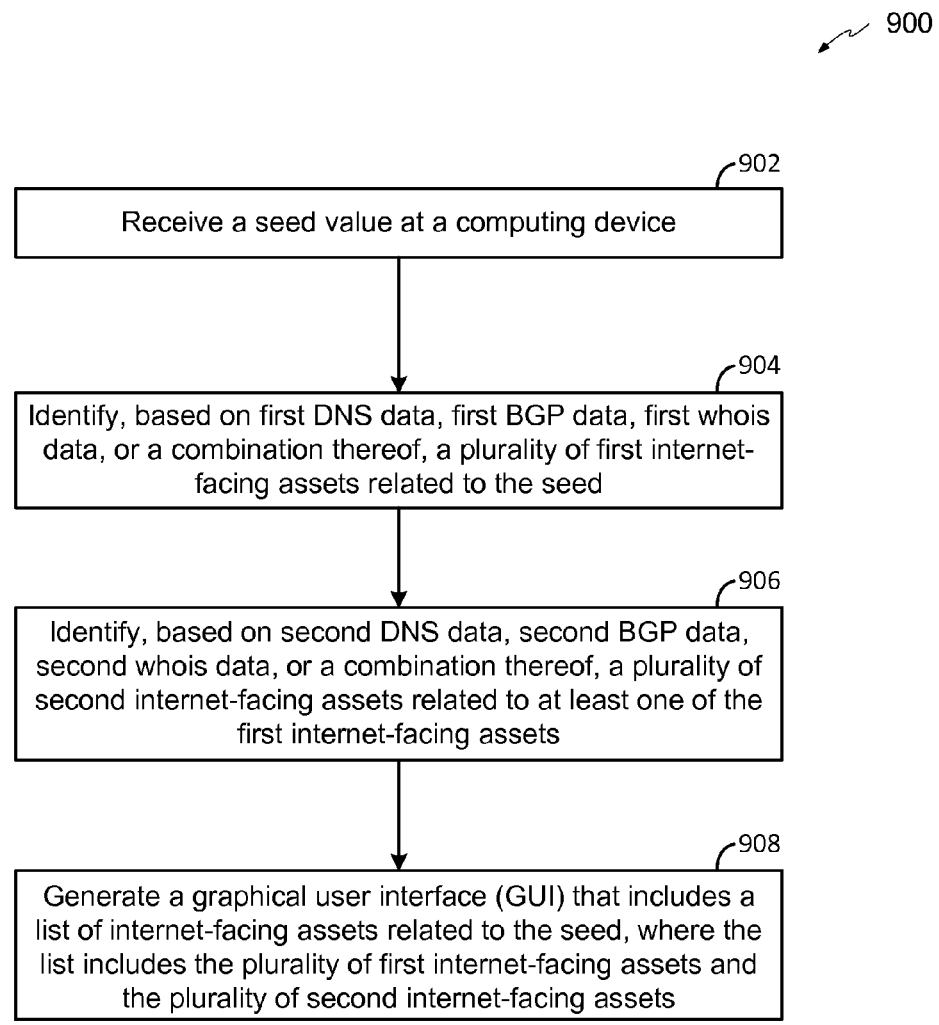
FIG. 9 is a flowchart illustrating a method of identifying internet-facing assets.

Referring to FIG. 9, a flowchart illustrating a method 900 of identifying internet-facing assets is shown. In an illustrative embodiment, the method 900 is performed by a computing device executing a discovery and inventory application, such as the discovery and inventory application 109 or the discovery and inventory application 504. The method 900 includes receiving a seed value at a computing device, at 902. For example, the computing device 102 may receive a seed value from the user 108. The method 900 further includes identifying, based on first DNS data, first BGP data, first whois data, or a combination thereof, a plurality of first internet-facing assets related to the seed, at 904. For example, the discovery and inventory application 109 may discover domains related to the seed (e.g., the first domain 118) based on searching the whois database 116, the BGP database 115, the DNS response database 114, the DNS records 121 (e.g., DNS zone files), or a combination thereof.

The method 900 further includes identifying, based on second DNS data, second BGP data, second whois data, or a combination thereof, a plurality of second internet-facing assets related to at least one of the first internet-facing assets, at 906. For example, the discovery and inventory application 109 may identify the first DNS name server 120 within the first domain 118 based on data from the DNS response database 114, the DNS records 121 (e.g., DNS zone files), or a combination thereof. The discovery and inventory application 109 may further discover that the first DNS name server 120 stores records for the second domain 122 based on data from the DNS response database 114, the DNS records 121 (e.g., DNS zone files), or a combination thereof.

The method 900 further includes generating a GUI that includes a list of internet-facing assets related to the seed, where the list includes the plurality of first internet-facing assets and the plurality of second internet-facing assets, at 908. For example, the discovery and inventory application 109 may generate the GUI 300 that includes the first domain 118 and the second domain 122. The method 900 may thus enable automated identification of related internet-facing assets, such as internet-facing assets identified as being owned by or affiliated with a particular user or business entity.

It should be noted that although method 900 illustrates two levels of recursion (i.e., second assets identified based on the first assets related to the seed), it should be noted that the described techniques may enable any N levels of recursion to identify internet-facing assets, where N is an integer greater than or equal to 1. For example, a third level of recursion may include identifying third assets based on DNS data, BGP data, and/or whois data associated with the second assets.

In accordance with various embodiments of the present disclosure, the methods, functions, and modules described herein may be implemented by software programs executable by a computer system. Further, in exemplary embodiments, implementations can include distributed processing, component/object distributed processing, and parallel processing. For example, the computing device 102 may correspond to a cloud computing environment that includes multiple individual computing devices that perform operations in distributed and parallel fashion. Alternatively, virtual computer system processing can be used to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-9. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in one or more computer-readable or a processor-readable devices, such as a centralized or distributed database, and/or associated caches and servers. The terms "computer-readable device" and "processor-readable device" also include device(s) capable of storing instructions for execution by a processor or causing a computer system to perform any one or more of the methods or operations disclosed herein. Examples of such devices include, but are not limited to, random access memory (RAM), flash memory, read-only memory (ROM), programmable read-only memory (PROM), erasable programmable read-only memory (EPROM), electrically erasable programmable read-only memory (EEPROM), register-based memory, solid-state memory, a hard disk, a removable disk, a disc-based memory (e.g., compact disc read-only memory (CD-ROM)), or any other form of storage device. A computer-readable or processor-readable device is not a signal.

In a particular embodiment, a method includes receiving a seed at a computing device. The method further includes identifying, based on first DNS data, first BGP data, first whois data, or a combination thereof, a plurality of first internet-facing assets related to the seed. The method further includes identifying, based on second DNS data, second BGP data, second whois data, or a combination thereof, a plurality of second internet-facing assets related to at least one of the first internet-facing assets. The method further includes generating a GUI that includes a list of internet-facing assets related to the seed, where the list includes the plurality of first internet-facing assets and the plurality of second internet-facing assets.

In another particular embodiment, a computer-readable storage device stores instructions that, when executed by a processor, cause the processor to perform operations including receiving a seed at a computing device. The operations further include identifying, based on first DNS data, first BGP data, first whois data, or a combination thereof, a plurality of first internet-facing assets related to the seed. The operations further include identifying, based on second DNS data, second BGP data, second whois data, or a combination thereof, a plurality of second internet-facing assets related to at least one of the first internet-facing assets. The operations further include generating a GUI that includes a list of internet-facing assets related to the seed, where the list includes the plurality of first internet-facing assets and the plurality of second internet-facing assets.

In another particular embodiment, an apparatus includes a processor and a memory that stores instructions that, when executed by the processor cause the processor to perform operations including receiving a seed at a computing device. The operations further include identifying, based on first DNS data, first BGP data, first whois data, or a combination thereof, a plurality of first internet-facing assets related to the seed. The operations further include identifying, based on second DNS data, second BGP data, second whois data, or a combination thereof, a plurality of second internet-facing assets related to at least one of the first internet-facing assets. The operations further include generating a GUI that includes a list of internet-facing assets related to the seed, where the list includes the plurality of first internet-facing assets and the plurality of second internet-facing assets.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving a seed at a computing device, wherein the seed includes an identification of a domain name system (DNS) name server, an identification of a whois contact, an autonomous system number (ASN), a domain name, a host name, an Internet Protocol (IP) address, or a combination thereof;
   retrieving first data based on the seed, the first data indicating a plurality of first internet-facing assets, wherein the first data includes first DNS data retrieved from a DNS database based on the seed, first border gateway protocol (BGP) data retrieved from a BGP database based on the seed, first whois data retrieved from a whois database based on the seed, or a combination thereof;
   retrieving second data based on at least one of the first plurality of internet-facing assets, the second data indicating a plurality of second internet-facing assets, wherein the second data includes second DNS data retrieved from the DNS database based on at least one of the plurality of first internet-facing assets, second BGP data retrieved from the BGP database based on the at least one first internet-facing asset, second whois data retrieved from the whois database based on the at least one first internet-facing asset, or a combination thereof;
   generating a graphical user interface (GUI) that includes a list of internet-facing assets related to the seed, wherein the list identifies differences between the plurality of first internet-facing assets and the plurality of second internet-facing assets; and
   accessing, by the computing device via one or more proxy servers, at least one internet-facing asset of the plurality of first internet-facing assets or the plurality of second internet-facing assets.

2. The method of claim 1, further comprising retrieving third data indicating additional internet-facing assets associated with DNS name servers associated with the plurality of first internet-facing assets.

3. The method of claim 2, further comprising retrieving fourth data indicating hosts associated with the additional internet-facing assets.

4. The method of claim 2, further comprising receiving a canonical name (CNAME) record.

5. The method of claim 1, wherein the GUI is configured to receive user input indicating that a particular internet-facing asset is to be added to a scanning list, wherein internet-facing assets in the scanning list are scanned by the one or more proxy servers continuously, periodically, randomly, in response to user input, or any combination thereof.

6. The method of claim 5, wherein scanning the particular internet-facing asset generates additional information regarding the particular internet-facing asset, wherein the additional information indicates a language that the particular internet-facing asset is associated with, whether particular the internet-facing asset performs redirects, whether the particular internet-facing asset supports secure sockets layer (SSL), whether a SSL certificate associated with the particular internet-facing asset is valid, how many media files are associated with the particular internet-facing asset, whether the particular internet-facing asset is associated with malware, or a combination thereof.

7. The method of claim 5, further comprising generating an alert in response to determining, based on scanning the particular internet-facing asset, that the particular internet-facing asset violates a policy.

8. The method of claim 1, wherein the one or more proxy servers includes a plurality of proxy servers, and wherein each of the plurality of proxy servers belongs to a different domain, is located in a different geographic region, is associated with a different user agent, or a combination thereof.

9. The method of claim 8, wherein each of the different user agents corresponds to a different type of web browser used by the one or more proxy servers to access the at least one internet-facing asset.

10. The method of claim 1, wherein the seed is generated by a discovery application executing at the computing device via an iterative feedback process during identification of internet-facing assets related to a previously received seed.

11. The method of claim 1, wherein the seed is associated with a particular user or business entity.

12. The method of claim 1, further comprising receiving first information indicating that a DNS name server is associated with a particular internet-facing asset and receiving second information indicating domains for which the DNS name server is an authoritative name server.

13. The method of claim 1, wherein the seed is associated with information including an e-mail address, a physical address, a contact name, or a combination thereof, and wherein the first data is received from a database responsive to a query based on the information.

14. The method of claim 1, wherein the GUI is configured to receive user input dismissing a particular internet-facing asset, and further comprising refraining from including the dismissed internet-facing asset from a subsequently generated list of internet-facing assets.

15. The method of claim 1, further comprising determining, based on DNS records, whether a particular internet-facing asset includes a mail server, a DNS name server, or both.

16. The method of claim 1, further comprising port scanning the at least one internet-facing asset to determine whether the at least one internet-facing asset includes a web server.

17. A computer-readable storage device storing instructions that, when executed by a processor, cause the processor to perform operations including:
    receiving a seed at a computing device, wherein the seed includes an identification of a domain name system (DNS) name server, an identification of a whois contact, an autonomous system number (ASN), a domain name, a host name, an Internet Protocol (IP) address, or a combination thereof;
    retrieving first data based on the seed, the first data indicating a plurality of first internet-facing assets, wherein the first data includes first domain name system (DNS) data, first border gateway protocol (BGP) data, first whois data, or a combination thereof, a plurality of first internet-facing assets related to the seed;
    retrieving second data based on at least one of the first plurality of internet-facing assets, the second data indicating a plurality of second internet-facing assets, wherein the second data includes second DNS data, second BGP data, second whois data, or a combination thereof, a plurality of second internet-facing assets related to at least one of the plurality of first internet-facing assets;
    generating a graphical user interface (GUI) that includes a list of internet-facing assets related to the seed, wherein the list identifies differences between the plurality of first internet-facing assets and the plurality of second internet-facing assets; and
    accessing, by the computing device, via one or more proxy servers, at least one internet-facing asset of the plurality of first internet-facing assets or the plurality of second internet-facing assets to simulate requests from different geographic regions, different domains, different user agents, or a combination thereof.

18. The computer-readable storage device of claim 17, wherein accessing the at least one internet-facing asset via the one or more proxy servers includes scanning the at least one internet-facing asset using an anonymous request that originates from a proxy server of the one or more proxy servers.

19. The computer-readable storage device of claim 17, wherein the operations further include:
    receiving input via the GUI, the input indicating that a particular internet-facing asset is to be added to a scanning list;
    scanning the particular internet-facing asset; and
    generating an alert in response to determining, based on scanning the particular internet-facing asset, that the particular internet-facing asset violates a policy.

20. An apparatus comprising:
a processor; and
memory storing instructions that, when executed by the processor, cause the processor to perform operations including:
    receiving a seed at a computing device, wherein the seed includes an identification of a domain name system (DNS) name server, an identification of a whois contact, an autonomous system number (ASN), a domain name, a host name, an Internet Protocol (IP) address, or a combination thereof;
    retrieving first data based on the seed, the first data indicating a plurality of first internet-facing assets, wherein the first data includes first domain name system (DNS) data, first border gateway protocol (BGP) data, first whois data, or a combination thereof, a plurality of first internet-facing assets related to the seed;
    retrieving second data based on at least one of the first plurality of internet-facing assets, the second data indicating a plurality of second internet-facing assets, wherein the second data includes second DNS data, second BGP data, second whois data, or a combination thereof, a plurality of second internet-facing assets related to at least one of the plurality of first internet-facing assets;
    generating a graphical user interface (GUI) that includes a list of internet-facing assets related to the seed, wherein the list identifies differences between the plurality of first internet-facing assets and the plurality of second internet-facing assets; and
    accessing, by the computing device, at least one internet-facing asset of the plurality of first internet-facing assets or the plurality of second internet-facing assets via a plurality of proxy servers to simulate requests from different geographic regions, different domains, different user agents, or a combination thereof,
    wherein each of the plurality of proxy servers belongs to a different domain, is located in a different geographic region, is associated with a different user agent, or a combination thereof.

21. A method comprising:
receiving a request to identify a plurality of internet-facing assets associated with a seed, wherein the seed includes an identification of a domain name system (DNS) name server, an identification of a whois contact, an autonomous system number (ASN), a domain name, a host name, an Internet Protocol (IP) address, or a combination thereof;
identifying, based upon the seed, a first internet-facing asset;
identifying, based upon the first internet-facing asset, a second internet-facing asset; and
generating a graphical user interface (GUI), the GUI including a list of the first internet-facing asset and the second internet facing asset, wherein the GUI includes a display of a discovery path between the seed and an internet-facing asset selected from the list.

* * * * *